(No Model.)

C. F. GEORGE.
FINGER GUARD FOR HARVESTERS.

No. 568,135. Patented Sept. 22, 1896.

Witnesses.
F. L. Ourand
A. B. Suit

Inventor.
Charles F George
By H. Davidson
Attorney.

UNITED STATES PATENT OFFICE.

CHARLES F. GEORGE, OF DELANEY'S, DELAWARE.

FINGER-GUARD FOR HARVESTERS.

SPECIFICATION forming part of Letters Patent No. 568,135, dated September 22, 1896.

Application filed January 2, 1896. Serial No. 574,005. (No model.)

*To all whom it may concern:*

Be it known that I, CHARLES F. GEORGE, a citizen of the United States, residing at Delaney's, in the county of New Castle and State of Delaware, have invented certain new and useful Improvements in Finger-Guards for Harvesters; and I do declare the following to be a full, clear, and exact description of the invention, such as will enable others skilled in the art to which it appertains to make and use the same.

My invention has relation to improvements in finger-guards for harvesters, and the object is to provide an attachment, part, or element to the finger-guard of a harvester whereby the lodged grain will be raised up and the knives cut the same off at sufficient length that the heads will be saved instead of being lost, as now takes place under the operation of the modern cutters and harvesters.

I accomplish the purposes of my invention by the means illustrated in the accompanying drawings, wherein—

Figure 1:
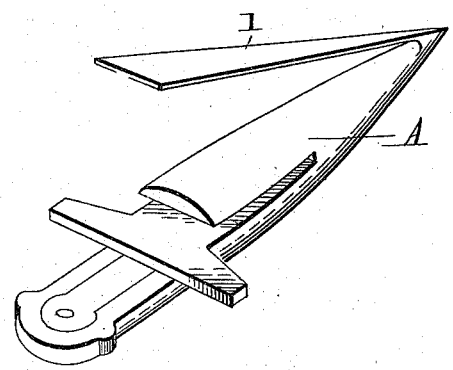
Figure 2:
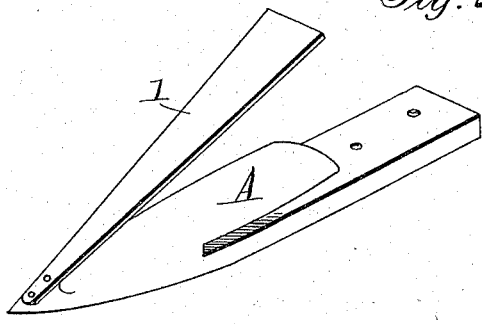
Figure 3:
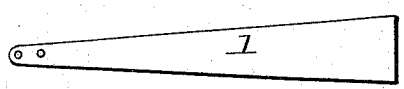

Figure 1 is a perspective of a finger-guard of well-known construction having my invention connected thereto. Fig. 2 is a similar view showing the spring secured by means of bolts and fastening-nuts. Fig. 3 is a plan view of the guard-spring.

A designates a finger or knife guard of a harvester, which, as is well known, is one of the teeth projecting forward from the cutter-bar of a harvester. This guard may be of any of the usual constructions in the art, my invention being applicable to all of them.

To the point of the guard is rigidly attached by metal welding or other cementation, or by means of bolts and screws, as indicated, the end of a metal spring 1, which is directed upward at an incline or angle of about forty-five degrees, substantially as seen in the drawings. The spring tapers from the head to the point of attachment substantially to the lateral contour of the guard. In the usual construction I have fixed upon the guard-points are made about ten inches long, and the springs stand directly over the top of the guards and are about twelve inches long and stand with the free end about eight inches above the guard, so that the fallen grain will be carried up free from the knife before the cut is made and the heads severed.

It will thus be perceived that when the guard encounters the fallen grain the stems will be directed upward and carried up on the inclines of the springs and that the cutters will sever them at such lengths that they will be carried over onto the table of the machine instead of being dropped and lost on the ground.

Having thus described my invention, what I claim, and desire to secure by Letters Patent, is—

A finger-guard for a harvester, formed with an upward inclined and flaring spring, having one end secured to the point of the guard, substantially as described.

In testimony whereof I hereunto affix my signature in presence of two witnesses.

CHARLES F. GEORGE.

Witnesses:
D. H. ROBINSON,
E. S. ROBINSON.